(12) United States Patent
Cho et al.

(10) Patent No.: US 12,743,234 B2
(45) Date of Patent: Sep. 22, 2026

(54) STORAGE DEVICE FOR STORING DATA FROM A PLURALITY OF TENANTS TO CORRESPOND TO A PLURALITY OF CHANNELS AND METHOD OF OPERATING THE SAME

(71) Applicant: SAMSUNG ELECTRONICS CO., LTD., Suwon-si (KR)

(72) Inventors: Jeongjae Cho, Suwon-si (KR); Youngil Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 18/634,541

(22) Filed: Apr. 12, 2024

(65) Prior Publication Data

US 2025/0094083 A1 Mar. 20, 2025

(30) Foreign Application Priority Data

Sep. 15, 2023 (KR) ........................ 10-2023-0123426

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ...... G06F 3/0604; G06F 3/061; G06F 3/0658; G06F 3/0659; G06F 3/0679; G06F 3/0688; G06F 2212/1016; G06F 2212/7208
See application file for complete search history.

(56) References Cited

U.S. PATENT DOCUMENTS

| | | | |
|---|---|---|---|
| 8,468,251 B1 | 6/2013 | Pijewski et al. | |
| 9,772,787 B2 | 9/2017 | Oikarinen et al. | |
| 10,628,388 B2 | 4/2020 | Joshi et al. | |
| 10,992,519 B2 | 4/2021 | Lisle et al. | |
| 2013/0173803 A1 | 7/2013 | Pijewski et al. | |
| 2015/0277802 A1* | 10/2015 | Oikarinen | G06F 3/0689 711/114 |

(Continued)

FOREIGN PATENT DOCUMENTS

| | | |
|---|---|---|
| EP | 4174646 A1 | 5/2023 |
| KR | 10-1999-0025288 A | 4/1999 |

OTHER PUBLICATIONS

Communication dated Feb. 3, 2025 issued by the European Patent Office in European Patent Application No. 24199132.2.

*Primary Examiner* — Larry T Mackall
(74) *Attorney, Agent, or Firm* — Sughrue Mion, PLLC

(57) ABSTRACT

A storage device includes a plurality of memory dies, corresponding to a plurality of channels and a plurality of ways, and a storage controller connected to the plurality of memory dies. The storage controller may be configured to receive commands from a plurality of tenants; in response to a number of the received commands being equal to or greater than a predetermined threshold value, determine a first number of channels required to store first data of a first tenant in each way of the plurality of ways based on commands received from the first tenant; and store the first data in the first number of memory dies in each way of the plurality of ways. The first data may be stored in memory dies that correspond to the plurality of channels in at least a portion or an entire portion of the plurality of ways.

20 Claims, 22 Drawing Sheets

(56) References Cited

U.S. PATENT DOCUMENTS

| | | | | |
|---|---|---|---|---|
| 2016/0179404 | A1* | 6/2016 | Nanduri ................ | G06F 3/0613 711/103 |
| 2016/0292216 | A1 | 10/2016 | Joshi et al. | |
| 2018/0246674 | A1 | 8/2018 | Kim et al. | |
| 2019/0005067 | A1 | 1/2019 | Bao et al. | |
| 2019/0286555 | A1 | 9/2019 | Park | |
| 2019/0296962 | A1 | 9/2019 | Lisle et al. | |
| 2019/0303293 | A1* | 10/2019 | Byun .................. | G06F 12/0607 |
| 2021/0357155 | A1 | 11/2021 | You | |
| 2023/0139519 | A1 | 5/2023 | Eun et al. | |

* cited by examiner

FIG. 3B

| | | Way | | | | | | | |
|---|---|---|---|---|---|---|---|---|---|
| | | w1 | w2 | w3 | w4 | w5 | w6 | w7 | w8 |
| Channel | ch1 | D11 | D12 | D13 | D14 | D15 | D16 | D17 | D18 |
| | ch2 | D21 | D22 | D23 | D24 | D25 | D26 | D27 | D28 |
| | ch3 | D31 | D32 | D33 | D34 | D35 | D36 | D37 | D38 |
| | ch4 | D41 | D42 | D43 | D44 | D45 | D46 | D47 | D48 |
| | ch5 | D51 | D52 | D53 | D54 | D55 | D56 | D57 | D58 |
| | ch6 | D61 | D62 | D63 | D64 | D65 | D66 | D67 | D68 |
| | ch7 | D71 | D72 | D73 | D74 | D75 | D76 | D77 | D78 |
| | ch8 | D81 | D82 | D83 | D84 | D85 | D86 | D87 | D88 |

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

FIG. 8

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

Tenant 3

Tenant 4

FIG. 9

| | | Way | | | | | | | |
|---|---|---|---|---|---|---|---|---|---|
| | | w1 | w2 | w3 | w4 | w5 | w6 | w7 | w8 |
| Channel | ch1 | | | | | | | | |
| | ch2 | | | | | | | | |
| | ch3 | | | | | | | | |
| | ch4 | | | | | | | | |
| | ch5 | | | | | | | | |
| | ch6 | | | | | | | | |
| | ch7 | | | | | | | | |
| | ch8 | | | | | | | | |

Tenant 1

Tenant 2

Tenant 3

Tenant 4

STORAGE DEVICE FOR STORING DATA FROM A PLURALITY OF TENANTS TO CORRESPOND TO A PLURALITY OF CHANNELS AND METHOD OF OPERATING THE SAME

CROSS-REFERENCE TO RELATED APPLICATION(S)

This application claims priority under 35 USC § 119 to Korean Patent Application No. 10-2023-0123426, filed on Sep. 15, 2023, in the Korean Intellectual Property Office, the disclosure of which is herein incorporated by reference in its entirety.

BACKGROUND

Example embodiments relate to a storage device and a method of operating the same.

Recently, as semiconductor technology continues to develop, the performance of computer processors has significantly improved. In addition, as multicore processor technology develops, the quantity of operations that may be performed simultaneously in a single computer server has significantly increased.

Accordingly, Internet data centers provide various and reliable services (for example, a web server, a mail server, a file server, a video server, and a cloud server) to different service users by installing hundreds or thousands of computer servers at a single place.

For example, as the number of tenants requesting a connection to a data center increases rapidly, the situation in which write requests are received from different tenants for storage devices of the data center is also increasing.

However, when data of each tenant is randomly stored (e.g., in a random memory die of a storage device) based on write requests received from different tenants, time required for a random read operation on the stored data is increases, and thus, read performance of the stored data may decrease. Also, when data transferred from a tenant is concentrated and stored in a specific channel(s), time required for sequential read operations on the data may increase. Accordingly, there is a growing need for a method of storing data received from each of a plurality of tenants to improve read performance.

SUMMARY

Example embodiments provide a storage device for improving read performance and a method of operating the storage device.

According to an example embodiment, a storage device includes a plurality of memory dies, corresponding to a plurality of channels and a plurality of ways, and a storage controller connected to the plurality of memory dies. The storage controller may be configured to receive commands from a plurality of tenants; in response to a number of the received commands being equal to or greater than a predetermined threshold value, determine a first number of channels required to store first data of a first tenant in each way of the plurality of ways based on commands received from the first tenant; and store the first data in the first number of memory dies in each way of the plurality of ways. The first data may be stored in memory dies that correspond to the plurality of channels in at least a portion or an entire portion of the plurality of ways.

According to an example embodiment, a method of operating a storage device includes receiving commands from a plurality of tenants; in response to a number of the received commands being equal to or greater than a predetermined threshold value, determining a first number of channels, among a plurality of channels, required to store first data of a first tenant in each way of a plurality of ways based on commands received from the first tenant, each channel of the plurality of channels comprising a plurality of memory dies corresponding to the plurality of ways; and storing the first data in the first number of memory dies in each way of the plurality of ways. The first data may be stored in memory dies that correspond to the plurality of channels in at least a portion or an entire portion of the plurality of ways.

According to an example embodiment, a storage device includes a nonvolatile memory device comprising a plurality of channels, each channel of the plurality of channels comprising a plurality of memory dies corresponding to a plurality of ways; and a storage controller. The storage controller may include a command queue configured to store commands transmitted from a plurality of tenants; an input command handler configured to fetch the commands from the command queue; a channel allocator configured to determine a first number of channels required to store first data of a first tenant based on information included in commands received from the first tenant; and a placement unit configured to store the first data in the first number of memory dies in each way of the plurality of ways. The first data may be stored in memory dies that evenly correspond to the plurality of channels in at least a portion or an entire portion of the plurality of ways.

BRIEF DESCRIPTION OF DRAWINGS

The above and other aspects, features, and advantages of some example embodiments will be more clearly understood from the following detailed description, taken in conjunction with the accompanying drawings.

FIG. 3B is a diagram illustrating a plurality of memory dies represented in a form of a matrix according to an example embodiment.

FIG. 8 is a diagram illustrating a configuration, in which a storage controller stores data for each of a plurality of tenants, according to example an embodiment.

FIG. 9 is a diagram illustrating a configuration in which a storage controller according to an example embodiment stores data for each of a plurality of tenants requiring different numbers of channels.

DETAILED DESCRIPTION

Hereinafter, example embodiments will be described with reference to the accompanying drawings.

Figure 1:
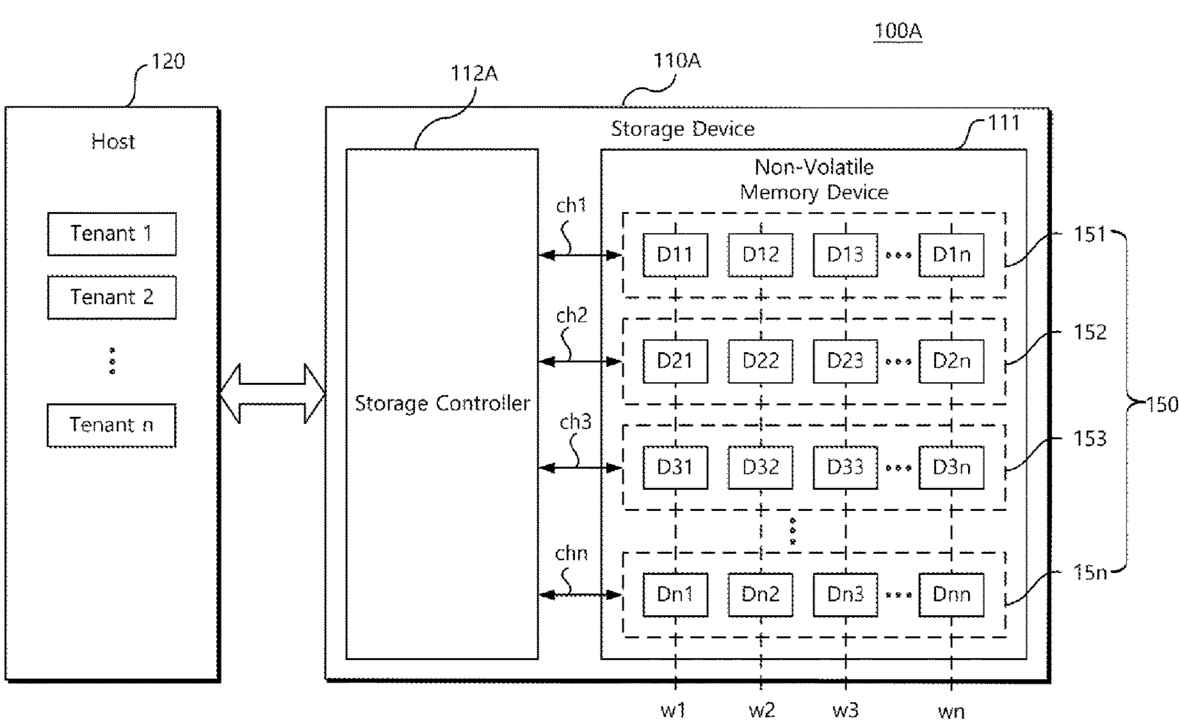
FIG. 1 is a block diagram of a storage system according to an example embodiment.

FIG. 1 is a block diagram of a storage system according to an example embodiment.

Referring to FIG. 1, a storage system 100A may include a host 120 and a storage device 110A. The storage device 110A may include a storage controller 112A and a nonvolatile memory 111.

According to an example embodiment, the storage device 110A may include a storage medium that stores data based on a request received from the host 120. For example, the storage device 110A may include at least one of a solid state drive (SSD), an embedded memory, and a removable external memory.

For example, when the storage device 110A is an SSD, the storage device 110A may be a device that complies with a nonvolatile memory express (NVMe) or compute express link (CXL) standard.

For example, when the storage device 110A is an embedded memory or an external memory, the storage device 110A may be a device that complies with a universal flash storage (UFS) or embedded multimedia card (eMMC) standard.

Each of the host 120 and the storage device 110A may generate packets based on an adopted standard protocol and transmit the generated packets.

According to an example embodiment, the host 120 may receive a command from a plurality of tenants Tenant 1 to Tenant n and transmit the received command to the storage device 110A.

For example, the host 120 may a receive write command from each of the first and second tenants Tenant 1 and Tenant 2 and transmit the received write command to the storage device 110A.

For example, the host 120 may receive a read command from each of the first and second tenants Tenant 1 and Tenant 2 and transmit the received read command to the storage device 110A.

However, the plurality of tenants that transmit commands to the storage device 110A through the host 120 are not limited to the above-described first and second tenants Tenant 1 and Tenant 2, and three or more tenants may transmit commands to the storage device 110A through 120.

The storage device 110A may include the storage controller 112A that stores data of each tenant in the nonvolatile memory device 111 and/or reads data stored in the nonvolatile memory device 111, based on a command received through the host 120.

The storage controller 112A may control at least one component of the storage device 110A, such as the nonvolatile memory device 111, by executing, for example, software (or a program), and may perform various data processing and/or operations. The storage controller 112A may include, for example, a central processing unit or a microprocessor, and may control the overall operation of the storage device 110A. Accordingly, the following operations performed by the storage device 110A may be understood as being performed under the control of the storage controller 112A.

According to an example embodiment, the storage controller 112A may include an algorithm for storing and/or reading data transmitted from a plurality of tenants. For example, the algorithm may be a software code programmed in the storage controller 112A. For example, the algorithm may be a hard code hard-coded in the storage controller 112A, but example embodiments are not limited thereto.

For example, the algorithm may be referred to as a control logic, but example embodiments are not limited thereto.

The storage controller 112A may store data, transmitted from a plurality of tenants, in the nonvolatile memory device 111 and/or read data stored in the nonvolatile memory device 111, based on an algorithm.

For example, the storage device 110A may store first data of the first tenant Tenant 1 in the nonvolatile memory device 111 based on a write command of the first tenant Tenant 1 received through the host 120.

For example, the storage device 110A may read second data of the second tenant Tenant 2 stored in the nonvolatile memory device 111, based on a read command of the second tenant Tenant 2 received through the host 120.

The storage device 110A may obtain information on identification ID, assigned to each of the plurality of tenants, from the host 120. Furthermore, the storage device 110A may identify data transmitted from each tenant, based on the obtained information.

For example, the storage device 110A may identify the first data of the first tenant Tenant 1 and the second data of the second tenant Tenant 2 based on ID information transmitted from the host 120.

For example, the storage device 110A may also obtain information on a size of a memory area or the number of memory dies, required to store data of each tenant, from the host 120.

According to an example embodiment, the nonvolatile memory device 111 of the storage device 110A may include a plurality of memory dies 150.

For example, the nonvolatile memory device 111 may include the plurality of memory dies 150 corresponding to a plurality of channels ch1 to chn.

The nonvolatile memory device 111 may include a plurality of first memory dies 151 corresponding to a first channel ch1. In addition, the nonvolatile memory device 111 may include a plurality of second memory dies 152 corresponding to a second channel ch2. In addition, the nonvolatile memory device 111 may include a plurality of third memory dies 153 corresponding to a third channel ch3.

Each of the plurality of memory dies 150 may be connected to the storage controller 112A through a corresponding channel.

Each of the plurality of memory dies 151, 152, 153 to 15*n*, respectively corresponding to the channels ch1, ch2, ch3 to chn, may correspond to a plurality of ways w1 to wn. A memory die may be selected in a channel unit and a way unit, and the term "way" may be used to refer to memory dies at respective channels that may be selected in a way unit. Memory dies connected to each channel may form the plurality of ways w1 to wn. A way may be a unit for distinguishing memory dies that share the same channel. Each of the memory dies may be identified according to a channel number and a way number. An example arrangement of the plurality of channels and the plurality of ways will be described hereinafter with reference to FIG. 3B below. While an example of n number of channels (n being an integer) and n number of ways is described, example embodiments are not limited thereto and the number of channels and the number of ways can be different from each other.

For example, each of the first memory dies D11, D12, D13, to D1*n* corresponding to the first channel ch1 may correspond to the plurality of ways w1 to wn. In addition, each of the second memory dies D21, D22, D23, to D2*n* corresponding to the second channel ch2 may correspond to the plurality of ways w1 to wn.

Here, n may be a positive integer and may be variously determined.

When the nonvolatile memory device 111 of the storage device 110A includes a flash memory, the flash memory may include a two-dimensional (2D) NAND memory array or a three-dimensional (3D) or vertical NAND (VNAND) memory array.

For example, the storage device 110A may include various other types of nonvolatile memories. For example, the storage device 110A may be implemented as a magnetic RAM (MRAM), a spin-transfer torque MRAM (STT-MRAM), a conductive bridging RAM (CBRAM), a ferroelectric RAM (FeRAM), a phase-change RAM (PRAM), a resistance RAM (ReRAM), or a variety of other types of memory.

According to an example embodiment, the storage controller 112A may store data of each tenant in at least a portion of the plurality of memory dies 150 based on the information obtained from the host 120. The term "at least a portion" used herein may be used to include not only a portion but also an entire portion of the element.

For example, the storage controller 112A may store data of each tenant in at least a portion of the plurality of memory dies 150 such that the data of each tenant corresponds to each of the plurality of channels ch1 to chn.

When a number of commands received from a plurality of tenants is greater than or equal to a predetermined threshold value, the storage controller 112A may determine a number of channels required to store the first data of the first tenant Tenant 1 in each way, of the plurality of ways, based on the received commands. The storage controller 112A may determine, for each of the plurality of ways, the number of channels required to store the first data of the first tenant Tenant 1.

For example, when the number of commands received from the first tenant Tenant 1 is "192" that is the predetermined threshold value, each of the commands is a write command to store 4 kB of data, and each memory die stores 192 KB of data, the storage controller 112A may determine that four channels are required to store the first data of the first tenant Tenant 1 in each way of the plurality of ways.

The storage controller 112A may store the first data in as many memory dies as the number of channels determined to be required to store the first data, among the memory dies corresponding to each way of the plurality of ways.

For example, the storage controller 112A may store first data in memory dies corresponding to the first channel ch1 to a fourth channel ch4 in a first way w1. In addition, the storage controller 112A may store first data in memory dies corresponding to a fifth channel ch5 to an eighth channel ch8 in a second way w2.

The first data may be stored to correspond to each of the plurality of channels ch1 to chn through at least a portion (e.g., a portion or an entire portion) of the plurality of ways w1 to wn. In other words, the first data may be stored in memory dies that correspond to each of the plurality of channels ch1 to chn in at least a portion or an entire portion of the plurality of ways w1 to wn. For example, the first data may be stored to evenly correspond (e.g., stored in the same number of memory dies corresponding to each channel) to the plurality of channels ch1 to ch8 through the first way w1 and the second way w2.

Referring to the above-described configurations, the storage controller 112A according to an example embodiment may store data of each tenant such that data of each tenant corresponds to the plurality of channels ch1 to chn through at least a portion of the plurality of ways w1 to wn.

Furthermore, the storage controller 112A according to an example embodiment may read data of each tenant using all of the plurality of channels ch1 to chn in response to receiving a read request from each tenant.

Accordingly, the storage device 110A according to an example embodiment may improve read performance for data of each tenant. For example, the storage device 110A may improve a read speed of sequential read for data of each of the plurality of tenants.

Figure 2:
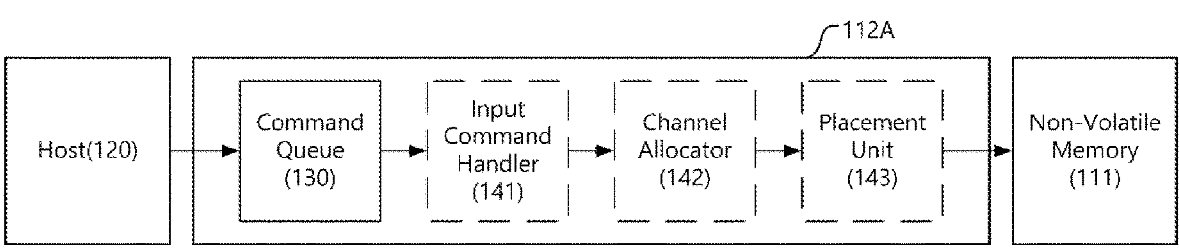
FIG. 2 is a block diagram illustrating a configuration of a storage controller of FIG. 1.

FIG. 2 is a block diagram illustrating a configuration of the storage controller of FIG. 1.

Referring to FIG. 2, the storage controller 112A may include a command queue 130, an input command handler 141, a channel allocator 142, and a placement unit 143.

According to an example embodiment, the storage controller 112A may include the command queue 130 configured to store commands transmitted from a plurality of tenants through the host 120.

The storage controller 112A may receive commands and/or data of a plurality of tenants transmitted from the host 120 through the command queue 130.

In addition, the storage controller 112A may store at least a portion of the commands and the data of the plurality of tenants transmitted from the host 120 through the command queue 130.

According to an example embodiment, the storage controller 112A may include the input command handler 141 configured to fetch stored commands from the command queue 130.

For example, the input command handler 141 may sequentially fetch commands stored in the command queue 130.

In addition, the input command handler 141 may identify a tenant in which a command has been generated and data included in the corresponding command, based on information included in the corresponding command.

For example, the input command handler 141 may identify the first tenant that has generated a first command and the first data included in the first command, based on an identifier included in the first command.

In addition, the storage controller 112A may include the channel allocator 142 configured to determine a number of channels required to store data of a tenant based on information included in a command.

For example, the channel allocator 142 may determine a number of channels required to store the first data of the first tenant Tenant 1 in each way, based on information included in the first command transmitted from the first tenant Tenant 1.

According to an example embodiment, the channel allocator 142 may determine a number of commands received from the plurality of tenants and/or a number of write requests included in the received commands.

In addition, the channel allocator 142 may determine whether the number of commands received from the plurality of tenants or the number of write requests included in the received commands is greater than or equal to a predetermined threshold value.

For example, the channel allocator 142 may determine whether the number of commands received from the first tenant Tenant 1 and the second tenant Tenant 2 is greater than or equal to "384," which is a predetermined threshold value.

For example, the channel allocator 142 may determine whether the number of write requests included in commands received from the first tenant Tenant 1 and the second tenant Tenant 2 is greater than or equal to "384," which is a predetermined threshold value.

Furthermore, when the number of commands received from the plurality of tenants or the number of write requests included in the received commands is greater than or equal to the predetermined threshold value, the channel allocator 142 may determine the number of channels required to store data of each tenant in each way.

For example, when the number of write requests included in commands received from the first tenant Tenant 1 and the second tenant Tenant 2 is greater than or equal to the predetermined threshold value, the channel allocator 142 may determine that a first number of channels are required to store the first data of the first tenant Tenant 1 for each way and a second number of channels are required to store the second data of the second tenant Tenant 2 for each way.

The number of channels required to store data of each tenant in each way may be determined based on the number of commands (or write requests) received from each tenant and the amount of data to be stored in a single memory die.

For example, a write request for each command may be understood as a command or signal requesting storage of 4 kB of data, but example embodiments are not limited thereto. However, for ease of description, an example will be provided below in which a write request for each command is a command requesting storage of 4 kB of data. For example, when 192 write requests are received from the first tenant Tenant 1 and 192 write requests are received from the second tenant Tenant 1, the channel allocator 142 may determine whether the number of write requests included in commands received from the first tenant Tenant 1 and the second tenant Tenant 2 is greater than or equal to "384," which is the predetermined threshold value. When 192 KB of data can be stored in each memory die, the channel allocator 142 may determine that four channels are required to store the first data. In addition, the channel allocator 142 may determine that four channels are required to store the second data.

For example, when 96 write requests are received from the first tenant Tenant 1 and 288 write requests are received from the second tenant Tenant 2, the channel allocator 142 may determine whether the number of write requests included in commands received from the first tenant Tenant 1 and the second tenant Tenant 2 is greater than or equal to "384," which is the predetermined threshold value. When 192 KB of data can be stored in each memory die, the channel allocator 142 may determine that two channels are required to store the first data. In addition, the channel allocator 142 may determine that six channels are required to store the second data.

However, commands received from the plurality of tenants, write requests received from the plurality of tenants, and the amount of data stored that can be stored in each memory die are not limited to the above-described examples.

In addition, the predetermined threshold value may be set based on the number of channels ch1 to chn and the amount of data that can be stored in one of the plurality of memory dies 150.

For example, when the storage device 110A includes eight channels and data corresponding to 48 write requests are to be stored in each memory die, a threshold value of 384 may be set.

However, a size of the predetermined threshold value and the method for setting the threshold value are not limited to the above-described examples.

The storage controller 112A may include the placement unit 143 configured to store the first data in a number of memory dies, equal to the number of channels determined by the channel allocator 142, among memory dies corresponding to each way.

For example, the placement unit 143 may store the first data in the plurality of memory dies 150 such that the first data evenly corresponds (e.g., stored in the same number of memory dies corresponding to each channel) to the plurality of channels ch1 to chn through memory dies corresponding to at least a portion of the plurality of ways w1 to wn.

For example, when it is determined that a first number of channels are required to store the first data in each way, the placement unit 143 may store the first data in the first number of memory dies, among memory dies corresponding to the first way w1.

In addition, the placement unit 143 may store the first data in the first number of memory dies, corresponding to channels in which no data is stored in the first way w1, among memory dies corresponding to the second way w2.

Referring to the above-described configurations, the storage controller 112A according to an example embodiment may store data of each tenant such that data of each tenant corresponds to each of the plurality of channels ch1 to chn through at least a portion of the plurality of ways w1 to wn.

Furthermore, the storage controller 112A according to an example embodiment may read data of each tenant using the plurality of channels ch1 to chn in response to receiving a read request from each tenant.

Accordingly, the storage device 110A according to an example embodiment may improve read performance for data of each tenant. For example, the storage device 110A may improve a read speed of sequential read for data of each of the plurality of tenants.

Figure 3A:
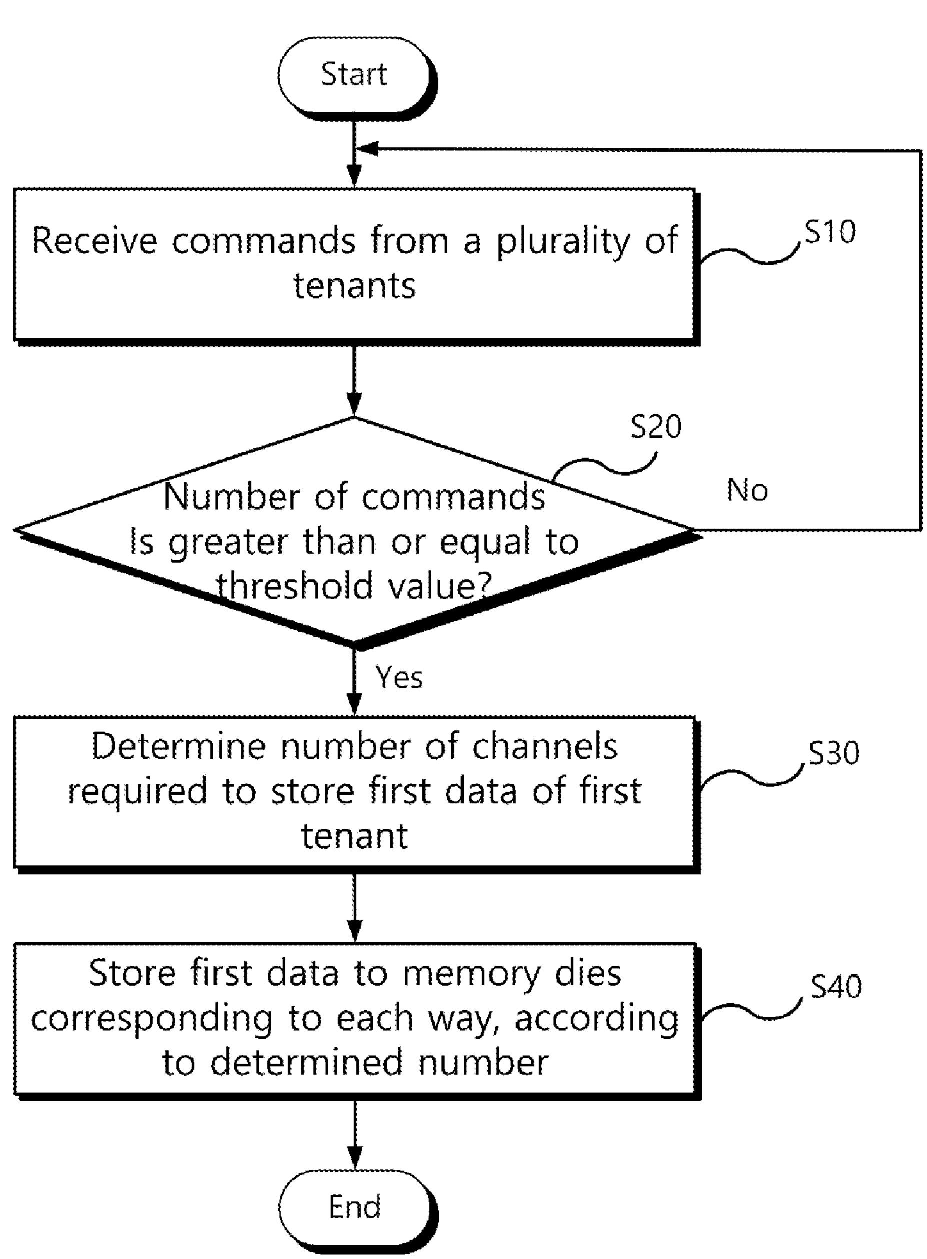
FIG. 3A is a flowchart illustrating a method of operating a storage device according to an example embodiment.

FIG. 3A is a flowchart illustrating a method of operating a storage device according to an example embodiment, and FIG. 3B is a diagram illustrating a plurality of memory dies represented in the form of a matrix according to an example embodiment.

Referring to FIGS. 3A and 3B together, the storage controller 112A according to an example embodiment may store data of each tenant in at least a portion of a plurality of memory dies 150 based on commands received from a plurality of tenants.

The storage device and the storage controller described with reference to FIGS. 3A and 3B may be understood as corresponding to the storage device 110A and the storage controller 112A of FIG. 1, respectively. Accordingly, the same reference numerals may be used to denote the same or substantially the same elements as those described above, and redundant description will be omitted.

For example, the storage controller 112A may store data of each tenant in at least a portion of a plurality of memory dies 150 such that the data of each tenant is stored to correspond to a plurality of channels ch1 to chn, based on commands received from a plurality of tenants.

Referring to FIG. 3A, in operation S10, the storage controller 112A may receive commands from a plurality of tenants.

For example, the storage controller 112A may receive commands including a write request for each data from a plurality of tenants.

For example, the storage controller 112A may receive a command, including a write request for first data, from a first tenant Tenant 1. In addition, the storage controller 112A may receive a command, including a write request for second data, from a second tenant Tenant 2.

In operation S20, the storage controller 112A may determine whether the number of received commands is greater than or equal to a threshold value.

For example, the storage controller 112A may determine whether the number of received commands is greater than or equal to a predetermined threshold value. The storage controller 112A may determine whether the number of write requests included in the received commands is greater than or equal to the predetermined threshold value.

The threshold value may be set based on the number of channels ch1 to chn and the amount of data to be stored in one of the plurality of memory dies 150.

For example, when the storage device 110A includes eight channels and data corresponding to 48 write requests are to be stored in each memory die, a threshold value of 384 may be set.

In operation S30, the storage controller 112A may determine the number of channels required to store the first data of the first tenant Tenant 1.

Referring to FIG. 3B, a plurality of memory dies 150 may correspond to eight ways and eight channels, respectively. Each way may include eight memory dies, respectively corresponding to a total of eight channels ch1 to ch8.

Accordingly, an array of the plurality of memory dies 150 may be represented as an 8×8 matrix with eight ways and eight channels.

However, the number and array of channels and ways, to which the plurality of memory dies 150 correspond, are not limited to the above-described examples, and the plurality of memory dies 150 may be configured to correspond to various numbers and array of channels and ways.

According to an example embodiment, the storage controller 112A may determine the number of channels required to store the first data of the first tenant Tenant 1 in each of the ways w1, w2, w3, w4, w5, w6, w7, and w8.

For example, the storage controller 112A (or the channel allocator 142) may determine the number of channels required to store the first data of the first tenant Tenant 1 in each of the ways w1, w2, w3, w4, w5, w6, w7, and w8 based on the received commands.

For example, when the number of commands received from the first tenant is "192", each command requesting storage of 4 kB of data, and each memory die stores 192 KB of data, the storage controller 112A may determine that four channels are needed to store the first data of the first tenant Tenant 1 in each way.

In operation S40, the storage controller 112A may store the first data in memory dies, respectively corresponding to the ways w1, w2, w3, w4, w5, w6, w7, and w8, based on the determined number of channels.

For example, when the storage controller 112A determines that a first number of channels are required to store the first data in each of the ways w1, w2, w3, w4, w5, w6, w7, and w8, the storage controller 112A may store the first data in the first number of memory dies, among memory dies respectively corresponding to the ways w1, w2, w3, w4, w5, w6, w7, and w8.

When it is determined that the first number of channels are required to store the first data in each of the ways w1, w2, w3, w4, w5, w6, w7, and w8, the storage controller 112A may store the first data in the first number of memory dies, among memory dies D11, D21, D31, D41, D51, D61, D71, and D81 corresponding to the first way w1.

In addition, the storage controller 112A may store the first data in the first number of memory dies, among memory dies D12, D22, D32, D42, D52, D62, D72, and D82 corresponding to the second way w2.

The first data may be stored to correspond to a plurality of channels ch1 to ch8 through at least a portion of the plurality of ways w1 to w8.

For example, when the first number of channels required to store the first data is determined as four, the storage controller 112A may store the first data in a 1-1-th memory die D11, a 2-1-th memory die D21, a 3-1-th memory die D31, and a 4-1-th memory die D41, among the memory dies D11, D21, D31, D41, D51, D61, D71, and D81 corresponding to the first way w1.

In addition, the storage controller 112A may store the first data in a 5-2-th memory die D52, a 6-2-th memory die D62, a 7-2-th memory die D72, and an 8-2-th memory die D82, among memory dies D12, D22, D32, D42, D52, D62, D72, and D82 corresponding to the second way w2.

In this case, for example, the first data may be stored to correspond to all of the plurality of channels ch1 to ch8 through the first way w1 and the second way w2.

Referring to the above-described configurations, the storage controller 112A may store data of each tenant such that the data of each tenant corresponds to the plurality of channels ch1 to ch8 through at least a portion of the plurality of ways w1 to w8.

Furthermore, the storage controller 112A according to an example embodiment may read the data of each tenant using the plurality of channels ch1 to ch8 in response to receiving a read request from each tenant.

Accordingly, the storage device 110A according to an example embodiment may improve read performance for data of each of a plurality of tenants. For example, the storage device 110A may improve a read speed of sequential read for data of each of the plurality of tenants.

Figure 4A:
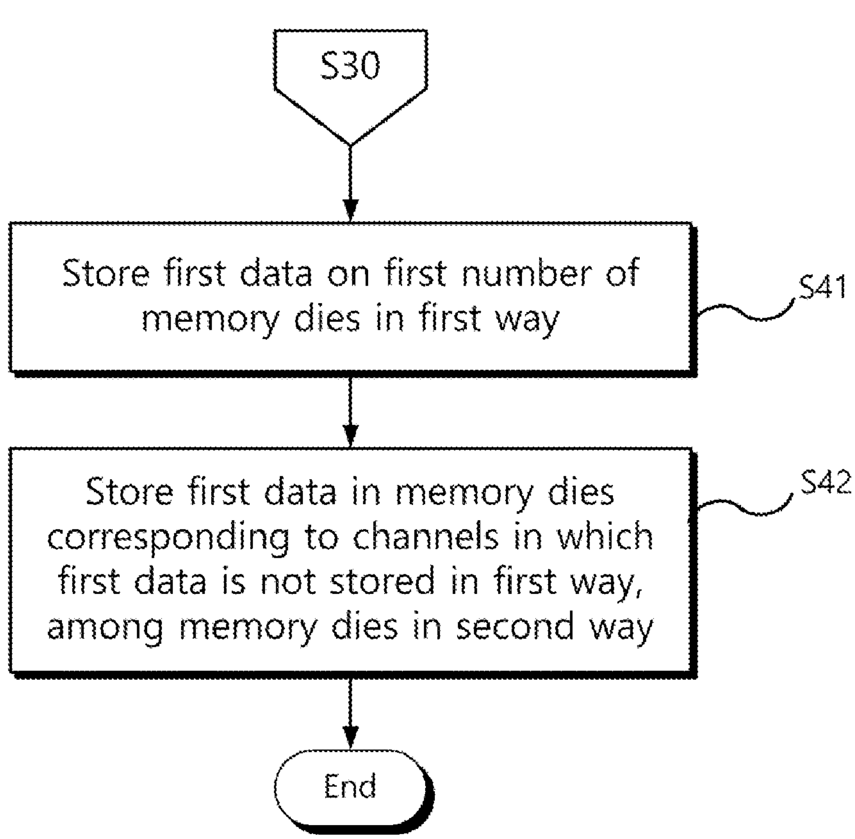
FIG. 4A is a flowchart illustrating a method, in which a storage controller stores first data of a first tenant in a first way and a second way, according to an example embodiment.
Figure 4B:
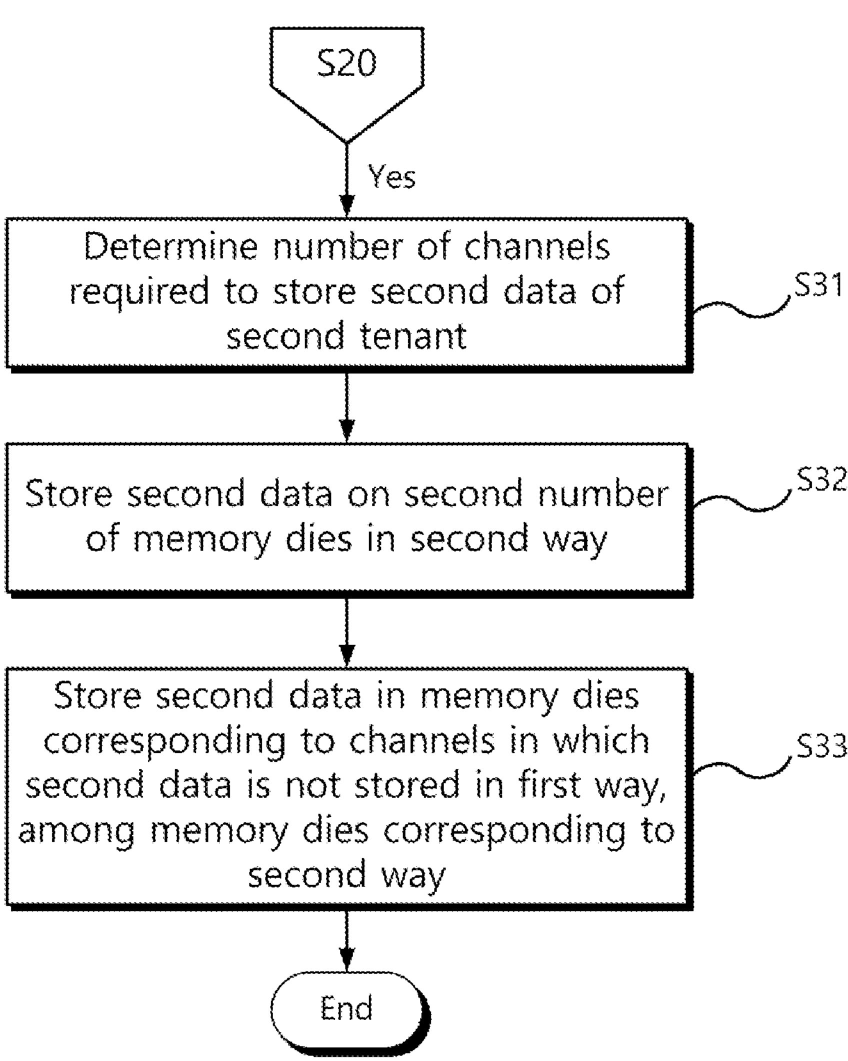
FIG. 4B is a flowchart illustrating a method, in which a storage controller stores second data of a second tenant in a first way and a second way, according to an example embodiment.
Figure 5A:
FIG. 5A is a diagram illustrating a configuration, in which first data and second data are stored in a first way, according to an example embodiment.
Figure 5A:
Figure 5B:
FIG. 5B is a diagram illustrating a configuration, in which first data and second data are stored in a second way, according to an example embodiment.
Figure 5B:
Figure 5C:
FIG. 5C is a diagram illustrating a configuration, in which first data and second data are stored in a plurality of ways, according to an embodiment.
Figure 5C:

FIG. 4A is a flowchart illustrating a method, in which a storage controller stores first data of a first tenant in a first way and a second way, according to an example embodiment, and FIG. 4B is a flowchart illustrating a method, in which a storage controller stores second data of a second tenant in a first way and a second way, according to an example embodiment. FIG. 5A is a diagram illustrating a configuration, in which first data and second data are stored in a first way, according to an example embodiment, FIG. 5B is a diagram illustrating a configuration, in which first data and second data are stored in a second way, according to an example embodiment, and FIG. 5C is a diagram illustrating a configuration, in which first data and second data are stored in a plurality of ways, according to an embodiment. The operations of FIGS. 4A and 4B may be understood as operations that are performed subsequent to operation S30 or S20 in FIG. 3A.

Referring to FIGS. 4A and 4B together, the storage controller 112A according to an embodiment may store data of each of a plurality of tenants in at least a portion of a plurality of memory dies 150 based on to a predetermined order (or array).

For example, the storage controller 112A may store data for each of the plurality of tenants in at least a portion of the plurality of memory dies 150 based on a number of channels determined to be required to store the data of each tenant and a predetermined order of storing the data of each tenant.

For example, the storage controller 112A may store first data of a first tenant Tenant 1 in a first number of memory dies among the memory dies D11 to D81 corresponding to a first way w1. In addition, the storage controller 112A may store first data in a first number of memory dies among the memory dies D12 to D82 corresponding to a second way w2.

Referring to FIG. 4A, in operation S41, the storage controller 112A may store first data in a first number of memory dies in the first way w1.

Referring to FIGS. 4A and 5A together, the storage controller 112A may store the first data of the first tenant Tenant 1 in the first number of memory dies, among memory dies D11 to D81 corresponding to the first way w1.

The first number may be understood as the number of channels determined to be required to store the first data in each way.

For example, referring to FIG. 5A, when the number of channels determined to be required to store the first data in a way is four, the storage controller 112A may store first data in a 1-1-th memory die D11, a 2-1-th memory die D21, a 3-1-th memory die D31, and a 4-1-th memory die D41, among the memory dies D11 to D81 corresponding to the first way w1.

In operation S42, the storage controller 112A may store the first data in a first number of memory dies corresponding to channels in which the first data is not stored in the first way w1, among memory dies D1 and D82 corresponding to the second way w2.

Referring to FIGS. 4A and 5B together, the storage controller 112A may store the first data of the first tenant Tenant 1 in the first number of memory dies, among the memory dies D12 to D82 corresponding to the second way w2.

For example, the storage controller 112A may store the first data in the first number of memory dies corresponding to channels, in which the first data is not stored in the first way w1, among the memory dies D12 to D82 corresponding to the second way w2.

For example, the storage controller 112A may store the first data in memory dies corresponding to the fifth channel ch5 to the eight channel ch8, in which the first data is not stored in the first way w1, among the memory dies D12 to D82 corresponding to the second way w2.

For example, the storage controller 112A may include the first data in a 5-2-th memory die D52, a 6-2-th memory die D62, a 7-2-th memory die D72, and an 8-2-th memory die D82, among the memory dies D12, D22, D32, D42, D52, D62, D72, and D82 corresponding to the second way w2.

According to the above-described configurations, the first data of the first tenant Tenant 1 may be stored to correspond to all of the plurality of channels ch1 to ch8 through the first way w1 and the second way w2.

Accordingly, the storage device 110A according to an example embodiment may improve read performance (for example, read speed) for the first data of the first tenant Tenant 1.

Referring to FIGS. 4B, 5A, and 5B together, the storage controller 112A may store the second data of the second tenant Tenant 2 in the second number of memory dies among the memory dies D11 to D81 corresponding to the first way w1. In addition, the storage controller 112A may store the second data in the second number of memory dies among the memory dies D12 to D82 corresponding to the second way w2.

The second number may be understood as the number of channels determined to be required to store the second data in each way.

In operation S31, the storage controller 112A may determine the number of channels required to store the second data of the second tenant Tenant 2 in each way.

For example, the storage controller 112A determines the number of channels required to store the second data of the second tenant Tenant 2 in each way, based on commands obtained from the second tenant Tenant 2.

For example, when the number of commands received from the second tenant Tenant 2 is "192" and each memory die can store 192 KB of data, the storage controller 112A may determine that four channels are required to store the second data in each way.

Referring to FIGS. 4B and 5A together, in operation S32, the storage controller 112A may store second data in the second number of memory dies in the first way w1.

For example, the storage controller 112A may store second data in the second number of memory dies, among the memory dies D11 to D81 corresponding to the first way w1.

The storage controller 112A may store the second data in the second number of memory dies, in which the first data is not stored, among the memory dies D11 to D81 corresponding to the first way w1.

For example, referring to FIG. 5A, the storage controller 112A may store second data in a 5-1-th memory die D51, a 6-1-th memory die D61, a 7-1-th memory die D71, and an 8-1-th memory die D81, among memory dies D11 to D81 corresponding to the first way w1.

Referring to FIGS. 4B and 5B together, in operation S33, the storage controller 112A may store the second data in the second number of memory dies corresponding to channels, in which the second data is not stored in the first way w1, among the memory dies D12 to D82 corresponding to the second way w2.

In addition, the storage controller 112A may store the second data in the second number of memory dies corresponding to channels, in which the first data is not stored, among the memory dies D12 to D82 corresponding to the second way w2.

For example, the storage controller 112A may store the second data in the second number of memory dies corresponding to channels, in which the first data is not stored, among the memory dies D12 to D82 corresponding to the second way w2.

For example, the storage controller 112A may store the second data in a 1-2-th memory die D12, a 2-2-th memory die D22, and a 3-2-th memory die D32, and a 4-2-th memory die D42, among the memory dies D12 to D82 corresponding to the second way w2.

According to the above-described configurations, the second data of the second tenant Tenant 2 may be stored to correspond to all of the plurality of channels ch1 to ch8 through the first way w1 and the second way w2.

Accordingly, the storage device 110A according to an example embodiment may improve read performance (for example, read speed) for the second data of the second tenant Tenant 2.

According to an example embodiment, the storage controller 112A may determine a ratio between the number of channels in which the first data are to be stored and the number of channels in which the second data are to be stored in each way, based on the commands received from the first tenant Tenant 1 and the second tenant Tenant 2.

The commands received from the respective tenants may be understood as including a write request for storing data of each tenant.

For example, the storage controller 112A may determine a ratio between the number of channels in which the first data and the second data are to be respectively stored in each way, based on the number of commands received from the first tenant Tenant 1 and the second tenant Tenant 2 per unit time.

For example, the storage controller 112A may identify a ratio between the number of channels in which data of a plurality of tenants are to be respectively stored, based on the number of predetermined channels for storing data of each of the plurality of tenants.

However, the method in which the storage controller 112A according to an example embodiment determines a ratio between the number of channels required to respectively store data of a plurality of tenants in each way is not limited to the above-described examples.

Furthermore, the storage controller 112A may store the first data and the second data in at least a portion of the plurality of memory dies 150 based on the determined ratio between the number of channels.

According to an example embodiment, when it is determined that the first data and the second data are to be stored in each way at a 1:1 ratio in terms of the number of channels for storing the first data and the second data, the storage controller 112A may store the first data and the second data in four memory dies among eight memory dies corresponding to each way.

According to an example embodiment, when it is determined that the first data and the second data are to be stored at a 1:3 ratio in terms of the number of channels for store the first data and the second data, the storage controller 112A may store the first data in two memory dies, among eight memory dies corresponding to each way, and store the second data in the remaining six memory dies.

The storage controller 112A may store first data and second data based on a predetermined order.

For example, the storage controller 112A may alternately store first data and second data in four memory dies among eight memory dies corresponding to the first way w1.

For example, the storage controller 112A may store the first data in four consecutive memory dies, among eight memory dies corresponding to the first way w1, and store the second data in the remaining four consecutive memory dies.

However, the number of tenants, the ratio between channels for storing data of the plurality of tenants, and the order in which the data is stored are not limited to the above-described examples.

Referring to FIG. 5C, first data and second data may each be stored to correspond to a plurality of channels ch1 to ch8 through memory dies corresponding to at least a portion of a plurality of ways w1 to w8.

The first data and the second data may each be stored to evenly correspond to the plurality of channels ch1 to ch8 through memory dies corresponding to at least a portion of the plurality of ways w1 to w8.

The first data and the second data may each be stored to correspond to all of the plurality of channels ch1 to ch8 through memory dies corresponding to at least a portion of the plurality of ways w1 to w8.

Accordingly, the storage device 110A according to an example embodiment may improve read performance for data of each of a plurality of tenants. For example, the storage device 110A may improve a read speed of sequential read for the data of each of the plurality of tenants.

Figure 6A:
FIG. 6A is a diagram illustrating a configuration, in which first data and second data are stored in a first way, according to an example embodiment.
Figure 6A:
Figure 6B:
FIG. 6B is a diagram illustrating a configuration, in which first data and second data are stored in a second way, according to an example embodiment.
Figure 6B:
Figure 6C:
FIG. 6C is a diagram illustrating a configuration, in which first data and second data are stored in a plurality of ways, according to an example embodiment.
Figure 6C:

FIG. 6A is a diagram illustrating a configuration, in which first data and second data are stored in a first way, according to an example embodiment, FIG. 6B is a diagram illustrating a configuration, in which first data and second data are stored in a second way, according to an example embodiment, and FIG. 6C is a diagram illustrating a configuration, in which first data and second data are stored in a plurality of ways, according to an example embodiment.

Referring to FIGS. 6A, 6B, and 6C together, the storage controller 112A according to an example embodiment may store data of each tenant in at least a portion of a plurality of memory dies 150, based on the number of channels determined to be required to store data of each tenant and a predetermined order (or array).

The storage controller and the plurality of memory dies of FIGS. 6A, 6B, and 6C may be understood as corresponding to the storage controller 112A and the plurality of memory dies 150 of FIG. 1. Accordingly, the same reference numerals are used to denote the same or substantially the same elements as those described above, and redundant description will be omitted.

According to an example embodiment, the storage controller 112A may store first data in a first number of memory dies among memory dies D11 to D81 corresponding to a first way w1. The first number may be understood as the number of channels determined to be required to store the first data in each way.

In addition, the storage controller 112A may store second data in a second number of memory dies among the memory dies D11 to D81 corresponding to the first way w1. The second number may be understood as the number of channels determined to be required to store the second data in each way.

According to an example embodiment, the first data and the second data may be alternately stored in the memory dies D11 to D81 corresponding to the first way w1.

For example, referring to FIG. 6A, the storage controller 112A may store the first data in a 1-1-th memory die D11, a 3-1-th memory die D31, a 5-1-th memory die D51, and a 7-1-th memory die D71, among the memory dies D11 to D81 corresponding to the first way w1.

In addition, the storage controller 112A may store the second data in a 2-1-th memory die D21, a 4-1-th memory die D41, a 6-1-th memory die D61, and an 8-1-th memory die D81, among the memory dies D11 to D81 corresponding to the first way w1.

Furthermore, referring to FIG. 6B, the storage controller 112A may store the first data in a first number of memory dies corresponding to channels, in which the first data is not stored in the first way w1, among memory dies D12 to D82 corresponding to a second way w2.

In addition, the storage controller 112A may store the second data in a second number of memory dies corresponding to channels, in which the first data is not stored, among the memory dies D12 to D82 corresponding to the second way w2.

For example, when the second data is stored in memory dies corresponding to a fifth channel ch5 to an eighth channel ch8 in the first way w1, the storage controller 112A may store the second data in memory dies corresponding to a first channel ch1 to a fourth channel ch4, in which the second data is not stored in the first way w1, among the memory dies D12 to D82 corresponding to the second way w2 (see FIG. 5B).

According to an example embodiment, the first data and the second data may be alternately stored in the memory dies D12 to D82 corresponding to the second way w2.

For example, the first data and the second data may be stored in the memory dies D12 to D82 corresponding to the second way, which is an inverse order (or inverse array) to an order in which the first data and the second data are stored in the memory dies D11 to D81 corresponding to the first way w1.

For example, referring to FIG. 6B, the storage controller 112A may store the first data in a 2-2-th memory die D22, a 4-2-th memory die D42, a 6-2-th memory die D62, and an 8-2-th memory die D82, among the memory dies D12 to D82 corresponding to the second way w2.

In addition, the storage controller 112A may store the second data in a 1-2-th memory die D12, a 3-2-th memory die D32, a 5-2-th memory die D52, a 7-2-th memory die D72, among the memory dies D12 to D82 corresponding to the second way w2.

Referring to FIG. 6C, the storage controller 112A according to an example embodiment may alternately store the first data and the second data in memory dies corresponding to each of a plurality of ways w1 to w8.

In addition, the storage controller 112A may store the first data and second data in memory dies corresponding to each way to have an inverse order to an order in which the first data and the second data are stored in an adjacent way.

Referring to the above-described configurations, the storage controller 112A may store a plurality of pieces of data of a plurality of tenants based on a predetermined order such that data of each tenant corresponds to the plurality of channels ch1 to ch8 through at least a portion of the plurality of ways w1 to w8.

Furthermore, the storage controller 112A according to an example embodiment may read data of each tenant using a plurality of channels (e.g., ch1 to ch8) in response to receiving a read request from each tenant.

Accordingly, the storage device 110A according to an example embodiment may improve read performance for data of each of the plurality of tenants. For example, the storage device 110A may improve a read speed of sequential read for data of each of the plurality of tenants.

Figure 7A:
FIG. 7A is a diagram illustrating a configuration, in which first data and second data requiring different numbers of channels are stored in a first way, according to an example embodiment.
Figure 7A:
Figure 7B:
FIG. 7B is a diagram illustrating a configuration, in which first data and second data requiring different numbers of channels are stored in a second way, according to an example embodiment.
Figure 7B:
Figure 7C:
FIG. 7C is a diagram illustrating a configuration, in which first data and second data requiring different numbers of channels are stored in a plurality of ways, according to an example embodiment.
Figure 7C:

FIG. 7A is a diagram illustrating a configuration, in which first data and second data requiring different numbers of channels are stored in a first way, according to an example embodiment, FIG. 7B is a diagram illustrating a configuration, in which first data and second data requiring different numbers of channels are stored in a second way, according to an example embodiment, and FIG. 7C is a diagram illustrating a configuration, in which first data and second data requiring different numbers of channels are stored in a plurality of ways, according to an example embodiment.

Referring to FIGS. 7A, 7B, and 7C together, the storage controller 112A according to an example embodiment may store data of each of a plurality of tenants in at least a portion of a plurality of memory dies 150 based on the number of channels determined to be required to store data of each tenant.

The storage controller and the plurality of memory dies of FIGS. 7A, 7B, and 7C may be understood as corresponding to the storage controller 112A and the plurality of memory dies 150 of FIG. 1, respectively. Accordingly, the same reference numerals are used to denote the same or substantially the same elements as those described above, and redundant description will be omitted.

For example, when a different number of channels are required to store data of each of a plurality of tenants in each way, the storage controller 112A may store data of each of the plurality of tenants in at least a portion of the plurality of memory dies 150 based on the number of channels required for data of each tenant.

According to an example embodiment, the storage controller 112A may determine a ratio between a number of channels (or memory dies) in which the first data and the second data are to be respectively stored in each way, based on a command received from a first tenant Tenant 1 and a command received from a second tenant Tenant 2.

Furthermore, the storage controller 112A may store first data and second data in at least a portion of the plurality of memory dies 150 based on the determined ratio between a number of channels.

For example, when it is determined that first data and second data are to be stored in each way at a channel ratio of 1:3, the storage controller 112A may store the first data in memory dies corresponding to two channels, among memory dies corresponding to eight channels, and store the second data in memory dies corresponding to two channels, for each way.

For example, referring to FIG. 7A, the storage controller 112A may store the first data in a 1-1-th memory die D11 and a 5-1-th memory die D51, among the memory dies D11 to D81 corresponding to the first way w1.

In addition, the storage controller 112A may store the second data in a 2-1-th memory die D21, a 3-1-th memory die D31, and a 4-1-th memory die D41, a 6-1-th memory die D61, a 7-1-th memory die D71, and an 8-1-th memory die D81*d*, among the memory dies D11 to D81 corresponding to the first way w1.

Furthermore, the storage controller 112A may store the first data in a first number of memory dies, corresponding to channels in which the first data is not stored in the first way w1, among memory dies D12 to D82 corresponding to the second way w2.

Furthermore, the storage controller 112A may store the second data in a second number of memory dies, corresponding to channels in which the second data is not stored in the first way w1, among the memory dies D12 to D82 corresponding to the second way w2.

For example, referring to FIG. 7B, the storage controller 112A may store the first data in a 2-2-th memory die D22 and a 6-2-th memory D62, among the memory dies D12 to D82 corresponding to the second way w2.

In addition, the storage controller 112A may store the second data in a 1-2-th memory die D12, a 3-2-th memory die D32, and a 4-2-th memory die D42, a 5-2-th memory die D52, a 7-2-th memory die D72, and an 8-2-th memory die D82, among the memory dies D12 to D82 corresponding to the second way w2.

Furthermore, the storage controller 112A may store the first data in a 3-3-th memory die D33 and a 7-3-th memory die D73, among memory dies D13 to D83 corresponding to the third way w3.

In addition, the storage controller 112A may store the second data in a 1-3-th memory die D13, a 2-3-th memory die D23, and a 4-3-th memory die D43, a 5-3-th memory die D53, a 6-3-th memory die D63, and an 8-3-th memory die D83, among the memory dies D13 to D83 corresponding to the third way w3.

In addition, the storage controller 112A may store the first data in a 4-4-th memory die D44 and an 8-4-th memory die D84, among memory dies D14 to D84 corresponding to the fourth way w4.

In addition, the storage controller 112A may store the second data in a 1-4-th memory die D14, a 2-4-th memory die D24, a 3-4-th memory die D34, a 5-4-th memory die D54, a 6-4-th memory die D64, and a 7-4-th memory die D74, among the memory dies D13 to D83 corresponding to the third way w3.

The first data and the second data may be stored to correspond to the plurality of channels ch1 to ch8 through memory dies corresponding to the first to fourth ways w1 to w4.

When the number of channels required to store the first data and the number of channels required to store the second data are different from each other, the storage controller 112A may first store data requiring a smaller number of channels in the memory dies D12 to D82 corresponding to the second way w2.

For example, when the first number (for example, "2") of channels required to store the first data is smaller than the second number (for example, "6") of channels required to store the second data, the storage controller 112A may store the first data in the first number of memory dies, among the memory dies D12 to D82 corresponding to the second way w2, and may then store the second data in the second number of memory dies, among the memory dies D12 to D82 corresponding to the second way w2.

Referring to FIG. 7C, the storage controller 112A according to an example embodiment may store first data and second data in a number of memory dies based on a determined ratio, among memory dies corresponding to each of a plurality of ways w1 to w8.

Referring to the above-described configurations, the storage controller 112A may store data of each tenant, requiring a different number of channels in each way, such that the data of each tenant corresponds to the plurality of channels ch1 to ch8 through at least a portion of the plurality of ways w1 to w8.

Furthermore, the storage controller 112A according to an example embodiment may read the stored data of each tenant using the plurality of channels ch1 to ch8 in response to receiving a read request from each tenant.

Accordingly, the storage device 110A according to an example embodiment may improve read performance for data of each of a plurality of tenants. For example, the storage device 110A may improve a read speed of sequential read for data of each of the plurality of tenants.

FIG. 8 is a diagram illustrating a configuration, in which a storage controller stores data for each of a plurality of tenants, according to example an embodiment.

Referring to FIG. 8, the storage controller 112A according to an embodiment may store data of each of a plurality of tenants in at least a portion of a plurality of memory dies 150 based on the number of channels determined to be required to store data of each tenant and a predetermined order (or order).

The storage controller and the plurality of memory dies of FIG. 8 may be understood as corresponding to the storage controller 112A and the plurality of memory dies 150 of FIG. 1, respectively. Accordingly, the same reference numerals are used to denote the same or substantially the same elements as those described above, and redundant description will be omitted.

According to an example embodiment, the storage controller 112A may obtain commands, including a write request for each data, from a first tenant Tenant 1 to a fourth tenant Tenant 4.

In addition, the storage controller 112A may determine the number of channels required to store data of each tenant in each way, based on the commands obtained from the first tenant Tenant 1 to the fourth tenant Tenant 4.

For example, the storage controller 112A may determine that a first number of channels are required to store first data of the first tenant in each way. In addition, the storage controller 112A may determine that a second number of channels are required to store second data of the second tenant in each way. In addition, the storage controller 112A may determine that a third number of channels are required to store third data of the third tenant in each way. In addition, the storage controller 112A may determine that a fourth number of channels are required to store fourth data of the fourth tenant in each way.

For example, the storage controller 112A may determine that two channels (or two memory dies corresponding to two channels) are required to store data of each tenant in each way, based on the commands obtained from the first tenant Tenant 1 to the fourth tenant Tenant 4.

The storage controller 112A may store data of each tenant in at least a portion of memory dies corresponding to each way, based on the number of channels determined to be required to store the data of each tenant in each way.

The first data, the second data, the third data, and the fourth data may be alternately stored in the memory dies D11, D21, D31, D41, D51, D61, D71, and D81 corresponding to the first way w1.

For example, the storage controller 112A may store first data in a 1-1-th memory die D11 and a 5-1-th memory die D51, among memory dies D11 to D81 corresponding to the first way w1.

In addition, the storage controller 112A may store second data in a 2-1-th memory die D21 and a 6-1-th memory die D61, among the memory dies D11 to D81 corresponding to the first way w1.

In addition, the storage controller 112A may store third data in a 3-1-th memory die D31 and a 7-1-th memory die D71, among the memory dies D11 to D81 corresponding to the first way w1.

In addition, the storage controller 112A may store fourth data in a 4-1-th memory die D41 and an 8-1-th memory die D81, among the memory dies D11 to D81 corresponding to the first way w1.

Furthermore, the storage controller 112A may store the first data in a first number of memory dies, corresponding to channels in which the first data is not stored in the first way w1, among memory dies D12 to D82 corresponding to the second way w2.

In addition, the storage controller 112A may store the second data in a second number of memory dies, corresponding to channels in which the second data is not stored in the first way w1, among the memory dies D12 to D82 corresponding to the second way w2.

In addition, the storage controller 112A may store a third number of memory dies, corresponding to channels in which the third data is not stored in the first way w1, among the memory dies D12 to D82 corresponding to the second way w2.

In addition, the storage controller 112A may store the fourth data in a fourth number of memory dies, corresponding to channels in which the fourth data is not stored in the first way w1, among the memory dies D12 to D82 corresponding to the second way w2.

The first data, the second data, the third data, and the fourth data may be alternately stored in the memory dies D12 to D82 corresponding to the second way w2.

Furthermore, the storage controller 112A according to an embodiment may alternately store the first data, the second data, the third data, and the fourth data to the memory dies corresponding to each of the plurality of ways w1 to w8.

According to an example embodiment, the storage controller 112A may store the first data, the second data, the third data, and the fourth data in memory dies corresponding to each way, based on a predetermined order.

However, the order in which the first data, the second data, the third data, and the fourth data are stored in each way is not limited to the above-escribed examples.

According to an example embodiment, each of the first data, the second data, the third data, and the fourth data may be stored to correspond to the plurality of channels ch1 to ch8 through at least a portion of the plurality of ways w1 to w8.

For example, each of the first data, the second data, the third data, and the fourth data may be stored to correspond to the plurality of channels ch1 to ch8 through the first way w1 to the fourth way w4.

Referring to the above-described configurations, the storage controller 112A may store data of each of the plurality of tenants such that the data of each tenant corresponds to the plurality of channels ch1 to ch8 through at least a portion of the plurality of ways w1 to w8.

Furthermore, the storage controller 112A according to an example embodiment may read the data of each tenant using the plurality of channels ch1 to ch8 in response to receiving a read request from each tenant.

Accordingly, the storage device 110A according to an example embodiment may improve read performance for data of each of a plurality of tenants. For example, the storage device 110A may improve a read speed of sequential read for data of each of the plurality of tenants.

FIG. 9 is a diagram illustrating a configuration in which a storage controller according to an example embodiment stores data for each of a plurality of tenants requiring different numbers of channels.

Referring to FIG. 9, the storage controller 112A according to an example embodiment may store data of each of a plurality of tenants in at least a portion of a plurality of memory dies 150 based on the number of channels, determined to be required to store the data of each of the plurality of tenants, and a predetermined order (or order).

The storage controller and the plurality of memory dies of FIG. 9 may be understood as corresponding to the storage controller 112A and the plurality of memory dies 150 of FIG. 1, respectively. Accordingly, the same reference numerals are used to denote the same or substantially the same elements as those described above, and redundant description will be omitted.

For example, when a different number of channels are required to store data for each of a plurality of tenants in each way, the storage controller 112A may store the data of each of the plurality of tenants in at least a portion of the plurality of memory dies 150 based on the number of channels required for the data of each tenant.

According to an example embodiment, the storage controller 112A may obtain commands, including a write request for each data, from a first tenant Tenant 1 to a fourth tenant Tenant4.

In addition, the storage controller 112A may determine the number of channels required to store data of each tenant in each way, based on the commands obtained from the first tenant Tenant 1 to the fourth tenant Tenant4.

For example, the storage controller 112A may determine the number of channels required to store the data of each tenant in each way based on the number of commands obtained from each tenant, among commands obtained from the first tenant Tenant 1 to the fourth tenant Tenant4.

For example, the storage controller 112A may determine that a single channel (or a single memory die) is required to store first data of the first tenant Tenant 1 in each way, based on the commands obtained from the first tenant Tenant 1 to the fourth tenant Tenant4.

In addition, the storage controller 112A may determine that a single channel (or a single memory die) is required to store second data of the second tenant Tenant 2 in each way, based on the commands obtained from the first tenant Tenant 1 to the fourth tenant Tenant4.

In addition, the storage controller 112A may determine that a single channel (or a single memory die) is required to store third data of the third tenant Tenant 3 in each way, based on the commands obtained from the first tenant Tenant 1 to the fourth tenant Tenant4.

In addition, the storage controller 112A may determine that five channels (or five memory dies) are required to store fourth data of the fourth tenant Tenant4 in each way, based on the commands obtained from the first tenant Tenant 1 to the fourth tenant Tenant4.

According to an example embodiment, the storage controller 112A may determine a ratio between channels (or memory dies) in which data of the first tenant Tenant 1 to data of the fourth tenant Tenant4 are respectively stored in each way, based on the commands obtained from the first tenant Tenant 1 to the fourth tenant Tenant4.

For example, the storage controller 112A may determine that the data of the first tenant Tenant 1 to the data of the fourth tenant Tenant4 are to be stored in memory dies corresponding to each way at a ratio of 1:1:1:5 in terms of a number of channels for storing the data of the first to the fourth tenants.

In this case, the storage controller 112A may store the first data in a single memory die among memory dies corresponding to each way, store second data in a single memory die, store third data in a single memory die, and store fourth data in five memory dies.

For example, the storage controller 112A may store first data in a 1-1-th memory die D11. In addition, the storage controller 112A may store second data in a 2-1-th memory die D21. In addition, the storage controller 112A may store third data in a 3-1-th memory die D31. In addition, the storage controller 112A may storage fourth data in a 4-1-th memory die D41, a 5-1-th memory die D51, a 6-1-th memory die D61, a 7-1-th memory die D71, and an 8-1-th memory die D81.

For example, the storage controller 112A may store the first data in a 2-2-th memory die D22. In addition, the storage controller 112A may store second data in a 3-2-th memory die D32. In addition, the storage controller 112A may store third data in a 4-2-th memory die D42. In addition, the storage controller 112A may store fourth data in a 1-2-th memory die D12, a 5-2-th memory die D52, a 6-2-th memory die D62, a 7-2-th memory die D72, and an 8-2-th memory die D82.

However, an array and/or an order in which the first data to the fourth data are stored in the memory dies corresponding to each way are not limited to the above-described examples.

The storage controller 112A may store the first data, the second data, the third data, and the fourth data in the plurality of memory dies 150 such that the data of each tenant corresponds to a plurality of channels ch1 to ch8, based on the number (or ratio) of determined channels.

For example, each of the first data, the second data, the third data, and the fourth data may be stored to correspond to the plurality of channels ch1 to ch8 through the first way w1 to the eighth way w8.

Referring to the above-described configurations, the storage controller 112A may store data of each tenant such that the data of each tenant corresponds to the plurality of channels ch1 to ch8 through at least a portion of the plurality of ways w1 to w8.

Furthermore, the storage controller 112A according to an example embodiment may read data of each tenant using the plurality of channels ch1 to ch8 in response to receiving a read request from each tenant.

Accordingly, the storage device 110A according to an example embodiment may improve read performance for data of each of a plurality of tenants. For example, the storage device 110A may improve a read speed of sequential read for data of each of the plurality of tenants.

Figure 10A:
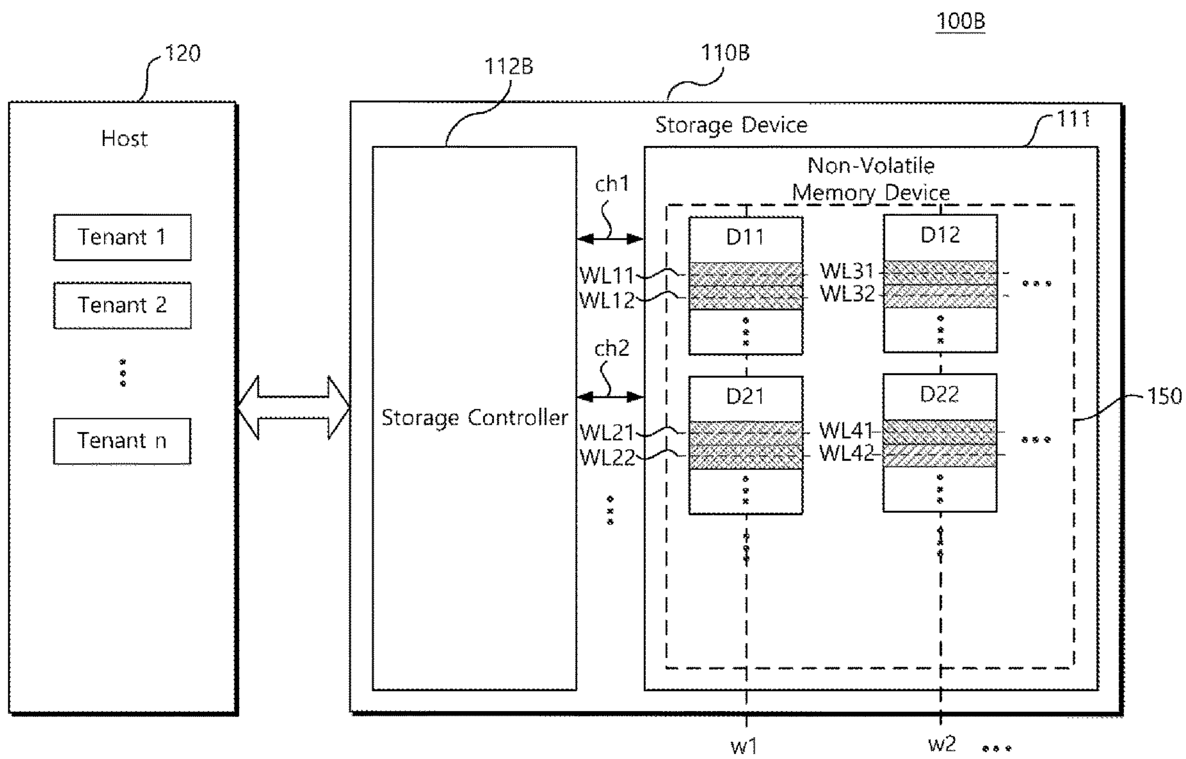
FIG. 10A is a block diagram of a storage system according to an example embodiment.
Figure 10B:
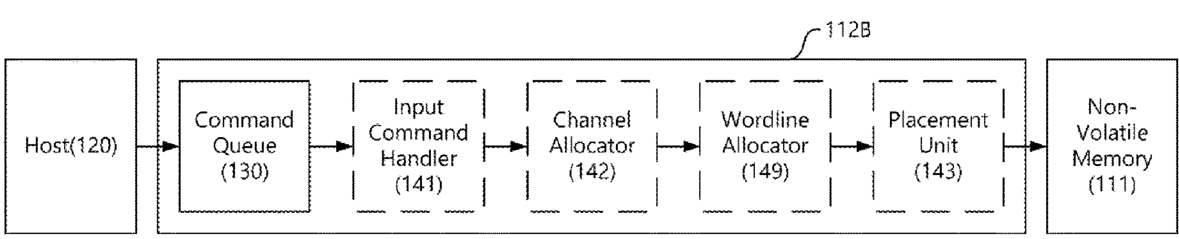
FIG. 10B is a block diagram illustrating a configuration of a storage controller of FIG. 10A.
Figure 11A:
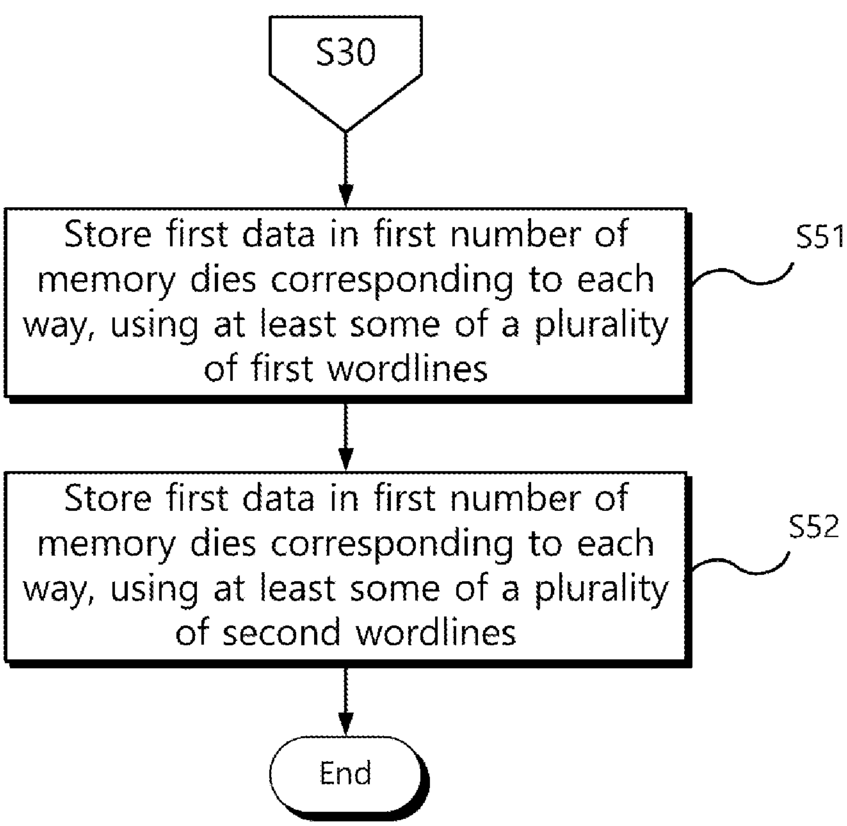
FIG. 11A is a flowchart illustrating a method, in which a storage controller stores first data and second data using a plurality of wordlines, according to an example embodiment.
Figure 11B:
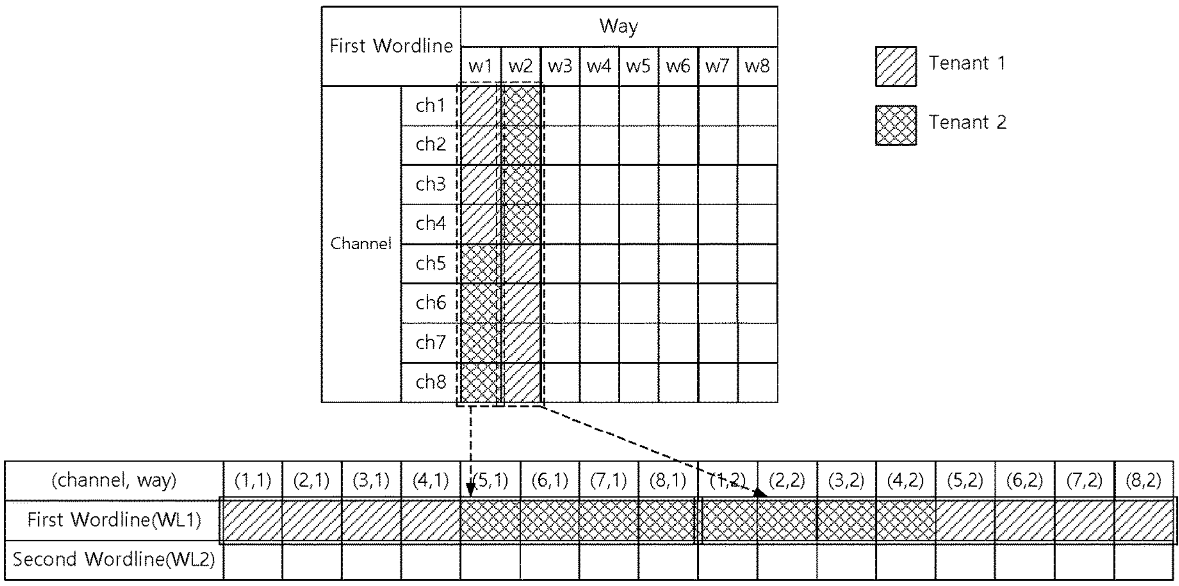
FIG. 11B is a diagram illustrating a configuration, in which a storage controller stores first data and second data using a first wordline, according to an example embodiment.
Figure 11C:
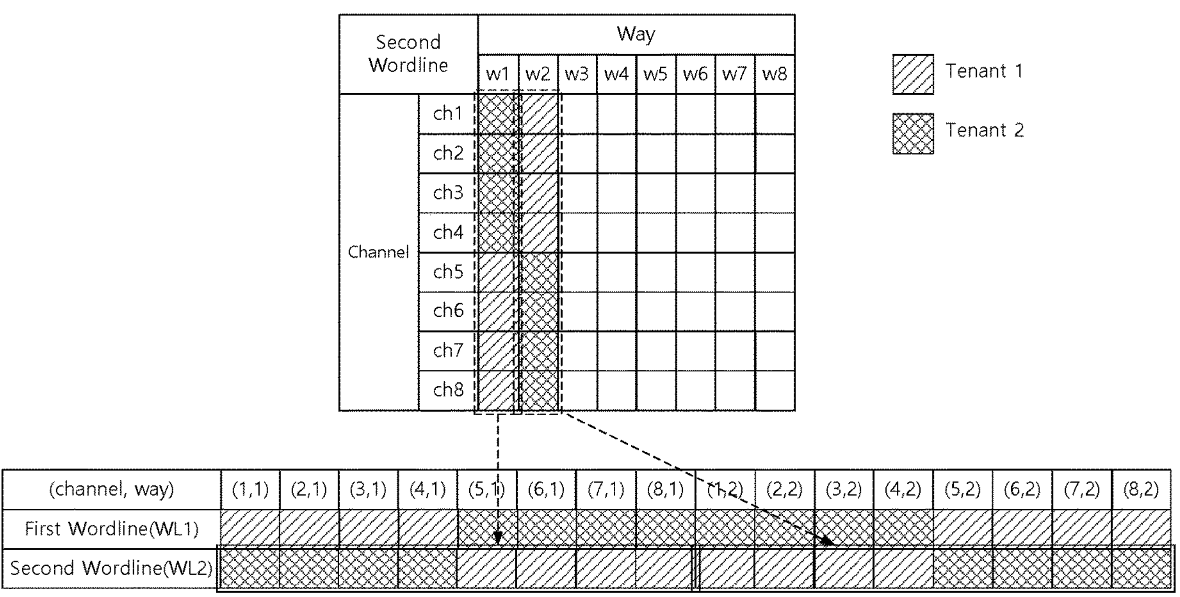
FIG. 11C is a diagram illustrating a configuration, in which a storage controller stores first data and second data using a second wordline, according to an example embodiment.

FIG. 10A is a block diagram of a storage system according to an example embodiment, and FIG. 10B is a block diagram illustrating a configuration of a storage controller of FIG. 10A. FIG. 11A is a flowchart illustrating a method, in which a storage controller stores first data and second data using a plurality of wordlines, according to an example embodiment, FIG. 11B is a diagram illustrating a configuration, in which a storage controller stores first data and second data using a first wordline, according to an example embodiment, and FIG. 11C is a diagram illustrating a configuration, in which a storage controller stores first data and second data using a second wordline, according to an example embodiment. The operations of FIG. 11A may be understood as operations that are performed subsequent to operation S30 in FIG. 3A.

Referring to FIG. 10A, a storage system 100B may include a host 120 and a storage device 110B. In addition, the storage device 110B may include a storage controller 112B and a nonvolatile memory device 111.

The storage system 100B and the storage device 110B of FIG. 10A may be understood as corresponding to the storage system 100A and the storage device 110A of FIG. 1, respectively. Accordingly, the same reference numerals are used to denote the same or substantially the same elements as those described above, and redundant description will be omitted.

According to an example embodiment, the nonvolatile memory device 111 of the storage device 110B may include a plurality of memory dies 150, each storing data transmitted from a plurality of tenants Tenant 1 to Tenant n.

Each of the plurality of memory dies 150 may include a plurality of wordlines. Data transmitted from the plurality of tenants Tenant 1 to Tenant n may be stored in memory cells connected to a selected wordline, among the plurality of wordlines.

For example, the storage controller 112B may select a 1-1-th wordline WL11 of a 1-1-th memory die D11 corresponding to a first channel ch1 and a first way w1. In this case, first data transmitted from the first tenant Tenant 1 may be stored in memory cells connected to the 1-1-th wordline WL11 of the 1-1 memory die D11.

In addition, the storage controller 112B may select a 1-2-th wordline WL12 of the 1-1-th memory die D11. In this case, second data transmitted from the second tenant Tenant 2 may be stored in memory cells connected to the 1-2-th wordline WL12 of the 1-1-th memory die D11.

In addition, the storage controller 112B may select a 3-1-th wordline WL31 of a 1-2-th memory dies D12 corresponding to the first channel ch1 and a second way w2. In this case, second data transmitted from the second tenant Tenant 2 may be stored in memory cells connected to the 3-1-th wordline WL31 of the 1-2-th memory die D12.

In addition, the storage controller 112B may select a 3-2-th wordline WL32 from the 1-2-th memory die D12. In this case, the first data transmitted from the first tenant Tenant 1 may be stored in memory cells connected to the 3-2-th wordline WL32.

However, the configuration in which the storage controller 112B stores data of each of a plurality of tenants using at least a portion of the plurality of wordlines is not limited to the above-described examples.

Referring to FIG. 10B, the storage controller 112B may include a command queue 130, an input command handler 141, a channel allocator 142, a wordline allocator 149, and a placement unit 143.

The command queue 130, the input command handler 141, the channel allocator 142, and the placement unit 143 may be understood as having the same configurations as the command queue 130, the input command handler 141, the channel allocator 142, and the placement unit 143 of FIG. 2, respectively. Therefore, redundant descriptions will be omitted.

According to an example embodiment, the wordline allocator 149 may select at least a portion of wordlines, in which data is to be stored, among the plurality of wordlines based on data previously stored in each memory die.

For example, the wordline allocator 149 may select at least a portion of the plurality of wordlines of each of the plurality of memory dies 150 such that data of each tenant corresponds to each of the plurality of memory dies 150.

For example, when the first data of the first tenant Tenant 1 is previously stored in the memory cells connected to the 1-1-th wordline WL11 of the 1-1-th memory die D11, the wordline allocator 149 may control the 1-1-th memory die D11 such that the second data of the second tenant Tenant 2 is stored in the memory cells connected to the 1-2-th wordline WL12 of the 1-1-th memory die D11.

For example, when the second data of the second tenant Tenant 2 is previously stored in the memory cells connected to the 3-1-th wordline WL31 of the 1-2-th memory die D12, the wordline allocator 149 may control the 1-2-th memory die D12 such that the first data of the first tenant Tenant 1 is stored in the memory cells connected to the 3-2-th wordline WL32 of the 1-2-th memory die D12.

The first data of the first tenant Tenant 1 may be stored to correspond to each of the plurality of memory dies 150. In addition, the second data of the second tenant Tenant 2 may be stored to correspond to each of the plurality of memory dies 150.

Referring to FIGS. 10A to 11C together, the storage controller 112B according to an example embodiment may store data of a plurality of tenants in cells connected to at least a portion of a plurality of wordlines included in each of the plurality of memory dies 150.

For example, the storage controller 112B may select corresponding wordlines among a plurality of wordlines included in each of a plurality of memory dies. The storage controller 112B may store the data of each tenant in memory cells connected to selected wordlines such that the data of each tenant corresponds to each of the plurality of memory dies 150.

Referring to FIG. 11A, in operation S51, the storage controller 112B may store the first data in a first number of memory dies, among memory dies corresponding to each way, using at least a portion of a plurality of first wordlines WL1.

The plurality of first wordlines WL1 may be understood as including a plurality of wordlines (for example, WL11, WL21, WL31, and WL41 in FIG. 10A) corresponding to each other, among a plurality of wordlines included in the plurality of memory dies 150. For example, the plurality of first wordlines WL1 in different memory dies may correspond to each other based on a location (or an order) of the first wordline among a plurality of wordlines included in each of the plurality of memory dies 150.

For example, the storage controller 112B may store the first data in memory cells connected to at least a portion of the plurality of first wordlines WL1 for a first number of memory dies among memory dies corresponding to each way.

Referring to FIGS. 11A and 11B together, the storage controller 112B may store the first data in memory cells connected to a portion (for example, WL11 and WL21 in FIG. 10A) of the plurality of first wordlines WL1 of the first number of memory dies among memory dies corresponding to a first way w1.

For example, the storage controller 112B may store the first data in memory cells connected to a portion (for example, WL11 and WL21 in FIG. 10A) of the plurality of first wordlines WL1 of a 1-1-th memory die D11, a 2-1-th memory die D21, a 3-1-th memory die D31, and a 4-1-th memory die D41 corresponding to the first way w1.

In addition, the storage controller 112B may store the second data in memory cells connected to at least a portion of the plurality of first wordlines WL1 of the second number of memory dies among the memory dies corresponding to the first way w1.

For example, the storage controller 112B may store the second data in memory cells connected to at least a portion of the plurality of first wordlines WL1 of a 5-1-th memory die D51, a 6-1-th memory die D61, a 7-1-th memory die D71, and an 8-1-th memory die D81.

According to an example embodiment, the storage controller 112B may store the first data and the second data in memory dies corresponding to a second way w2 such that each of the first data and the second data corresponds to the plurality of channels ch1 to ch8 through the first way w1 and the second way w2.

For example, the storage controller 112B may store the first data in memory cells corresponding to at least a portion of the plurality of first wordlines WL1 of a 5-2-th memory die D52, a 6-2-th memory die D62, a 7-2-th memory die D72, and an 8-2-th memory die D82 corresponding to the second way w2.

In addition, the storage controller 112B may store the second data in memory cells connected to at least a portion (e.g., WL31 and WL41 in FIG. 10A) of the plurality of wordlines WL1 of a 1-2-th memory die D12, a 2-2-th memory die D22, a 3-2-th memory die D32, and a 4-2-th memory die D42 corresponding to the second way w2.

The operation, in which the storage controller 112B stores the first data and the second data in memory cells connected to the plurality of first wordlines WL1, may be understood as being substantially the same as the operation of FIGS. 4A to 5C, in which the storage controller 112A stores the first data and the second data in at least a portion of the plurality of memory dies 150.

Referring to FIGS. 11A and 11C together, in operation S52, the storage controller 112B may store the first data in the first number of memory dies, among the memory dies corresponding to the first way w1, using at least a portion of a plurality of second wordlines WL2.

For example, the storage controller 112B may store the first data in memory cells connected to at least a portion of the plurality of second wordlines WL2 of the first number of memory dies among memory dies corresponding to the first way w1.

The plurality of second wordlines WL2 may be understood as including a plurality of wordlines (for example, WL12, WL22, WL32, and WL42 in FIG. 10A) corresponding to each other, among the plurality of wordlines included in the plurality of memory dies 150. For example, the plurality of second wordlines WL2 in different memory dies may correspond to each other based on a location (or an order) of the second wordline among a plurality of wordlines included in each of the plurality of memory dies 150.

For example, the storage controller 112B may store the first data in memory cells corresponding to at least a portion of the plurality of second wordlines WL2 of a 5-1-th memory die D51, a 6-1-th memory die D61, a 7-1-th memory die D71, and an 8-1-th memory die D81 among memory dies corresponding to the first way w1.

In addition, the storage controller 112B may store the second data in memory cells corresponding to at least a portion of the plurality of second wordlines WL2 of the second number of memory dies among memory dies corresponding to the first way w1.

For example, the storage controller 112B may store the second data in memory cells connected to at least a portion (for example, WL12 and WL22 in FIG. 10A) of the plurality of second wordlines WL2 of a 1-1-th memory die D11, a 2-1-th memory die D21, a 3-1-th memory die D31, and a 4-1-th memory die D41 corresponding to the first way w1.

According to an example embodiment, the storage controller 112B may store the first data and the second data in memory dies corresponding to the second way w2 such that each of the first data and the second data corresponds to the plurality of channels ch1 to ch8 through the first way w1 and the second way w2.

For example, the storage controller 112B may store the first data in memory cells connected to at least a portion (for example, WL32 and WL42 in FIG. 10A) of the plurality of second wordlines WL2 of a 1-2-th memory die D12, a 2-2-th memory die D22, a 3-2-th memory die D32, and a 4-2-th memory die D42 corresponding to the second way w2.

In addition, the storage controller 112B may store the second data in memory cells connected to at least a portion of the plurality of second wordlines WL2 of a 5-2-th memory die D52, a 6-2-th memory die D62, a 7-2 memory die D72, and an 8-2 memory die D82 corresponding to the second way w2.

However, the order in which operations S51 and S52 are performed is not limited to that illustrated in FIG. 11A. According to an example embodiment, operations S51 and S52 may be sequentially performed for each way.

The order of storing the first data and the second data in the memory cells connected to the plurality of second wordlines WL2 may be understood as an inverse order to an order of storing the first data and the second data in the memory cells connected to the plurality of wordlines WL1.

The storage controller 112B may store data of each tenant in memory cells connected to at least a portion of the plurality of wordlines of each of the plurality of memory dies 150 such that the data of each tenant corresponds to each of the plurality of memory dies 150.

Data of each of the plurality of tenants may be stored to correspond to each of the plurality of memory dies 150 through memory cells connected to at least a portion of the plurality of wordlines.

For example, the storage controller 112B may store data of a tenant, distinguished from the data of the tenant stored in memory cells connected to at least a portion of the plurality of first wordlines WL1, in memory cells connected to at least a portion of the plurality of second wordlines WL2 for each of the plurality of memory dies. The storage controller 112B may store data of a tenant in memory cells connected to at least a portion of the plurality of first wordlines WL1 for each of the plurality of memory dies and store the data of the tenant in memory cells connected to at least a portion of the plurality of second wordlines WL2 for each of the plurality of memory dies.

Accordingly, the number and distribution of memory dies, in which data of each tenant is stored, may increase.

For example, when the storage device 110 receives a read request for data of a specific tenant, the number of memory dies for reading the data of the tenant may increase.

Accordingly, the storage device 110B according to an example embodiment may improve read performance for data of each of a plurality of tenants. For example, the storage device 110 may improve a read speed of random read for data of each of the plurality of tenants.

As described above, the storage controller 112 according to an example embodiment may store data of each tenant such that the data of each tenant corresponds to a plurality of channels through at least a portion of a plurality of ways.

Furthermore, the storage controller 112 according to an example embodiment may read data of each tenant using a plurality of channels in response to receiving a read request from each tenant.

Accordingly, the storage device 110 according to an example embodiment may improve read performance for data of each tenant. For example, the storage device 110 may improve a read speed of sequential read for data of each of the plurality of tenants.

In addition, the storage controller 112 according to an example embodiment may store data of each tenant in memory cells connected to at least a portion of the plurality of wordlines of each of the plurality of memory dies 150 such that data of each of the plurality of tenants corresponds to each of the plurality memory dies 150.

Accordingly, the number and distribution of memory dies, in which data of each of a plurality of tenants is stored, may increase. As a result, the storage device 110 according to an example embodiment may improve performance (for example, speed) of random read for data of each of the plurality of tenants.

As set forth above, the storage device according to example embodiments may improve read performance.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While example embodiments have been shown and described above, it will be apparent to those skilled in the art that modifications and variations can be made without departing from the scope of the present inventive concept as defined by the appended claims and their equivalents.

What is claimed is:

1. A storage device comprising:

a plurality of memory dies corresponding to a plurality of channels and a plurality of ways; and a storage controller connected to the plurality of memory dies, wherein the storage controller is configured to:

receive commands from a plurality of tenants;

in response to a number of the received commands being equal to or greater than a predetermined threshold value, determine a first number of channels required to store first data of a first tenant in each way of the plurality of ways based on at least one of (i) a command received from the first tenant or (ii) a command received from each of the plurality of tenants; and store the first data in a first number of memory dies in each way of the plurality of ways, a value of the first number of the first number of channels being equal to a value of the first number of the first number of memory dies, and wherein the first data is stored in memory dies that correspond to the plurality of channels in at least a portion or an entire portion of the plurality of ways.

2. The storage device of claim 1, wherein the storage controller is further configured to:

store the first data in the first number of memory dies among memory dies corresponding to a first way; and store the first data in the first number of memory dies, corresponding to channels in which the first data is not stored in the first way, among memory dies corresponding to a second way.

3. The storage device of claim 2, wherein the storage controller is further configured to:

determine a second number of channels required to store second data of a second tenant in each way of the plurality of ways based on at least one of (i) a command received from the second tenant or (ii) the command received from each of the plurality of tenants; and store the second data in a second number of memory dies in each way of the plurality of ways, a value of the second number of the second number of channels being equal to a value of the second number of the second number of memory dies, and wherein the second data is stored in memory dies that correspond to the plurality of channels in at least a portion or the entire portion of the plurality of ways.

4. The storage device of claim 3, wherein the storage controller is further configured to:

store the second data in the second number of memory dies, among memory dies corresponding to the first way and in which the first data is not stored; and store the second data in at least a portion of memory dies, corresponding to the second wherein the first data is stored to correspond to each of the plurality of memory dies.

5. The storage device of claim 4, wherein the storage controller is further configured to store the first data and the second data in memory dies corresponding to the first way based on the value of the first number, the value of the second number, and a predetermined order of storing the first data and the second data.

6. The storage device of claim 5, wherein the storage controller, based on the value of the first number being smaller than the value of the second number, is further configured to store the first data in the first number of memory dies in the second way and subsequently store the second data in the second number of memory dies in the second way.

7. The storage device of claim 2, wherein each of the plurality of memory dies comprises a plurality of wordlines, wherein the storage controller is further configured to store the first data in memory cells, connected to wordlines corresponding to each other, among the first number of memory dies corresponding to each way of the plurality of ways, and channels, required to store first data of a first tenant in each way of a plurality of ways based on at least one of (i) a command received from the first tenant or (ii) a command received from each of the plurality of tenants, each channel of the plurality of channels comprising a plurality of memory dies corresponding to the plurality of ways; and storing the first data in a first number of memory dies in each way of the plurality of ways, a value of the first number of the first number of channels being equal to a value of the first number of the first number of memory dies, wherein the first data is stored in memory dies that correspond to the plurality of channels in at least a portion or an entire portion of the plurality of ways.

8. The storage device of claim 7, wherein the storage controller is further configured to:

store the first data in the first number of memory dies, among memory dies corresponding to the first way, using at least a portion of a plurality of first wordlines corresponding to each other in each of the plurality of memory dies; and store the first data in the first number of memory dies, among memory dies corresponding to the second way and in which the first data is not stored in memory cells connected to a first wordline of each of memory dies corresponding to the first way, using at least a portion of a plurality of second wordlines corresponding to each other in each of the plurality of memory dies.

9. The storage device of claim 1, wherein the storage controller is further configured to output the first data using the plurality of channels in response to receiving a read request for the first data.

10. The storage device of claim 1, wherein the storage controller is further configured to determine the first number of channels based on a number of the command received from the first tenant and an amount of data to be stored in a single memory die among the plurality of memory dies.

11. A method of operating a storage device, the method comprising:

receiving commands from a plurality of tenants;

in response to a number of the received commands being equal to or greater than a predetermined threshold value, determining a first number of channels, among a plurality of way and corresponding to a channel in which the second data is not stored in the first way, among memory dies in which the first data is not stored in the second way.

12. The method of claim 11, wherein the storing the first data comprises:

storing the first data in the first number of memory dies among memory dies corresponding to a first way among the plurality of ways; and storing the first data in the first number of memory dies corresponding to channels, in which the first data is not stored in the first way, among memory dies corresponding to a second way among the plurality of ways.

13. The method of claim 12, further comprising:

determining a second number of channels required to store second data of a second tenant in each way of the plurality of ways; and storing the second data in a second number of memory dies in each way of the plurality of ways, a value of the second number of the second number of channels being equal to a value of the second number of the second number of memory dies, wherein the second data is stored in memory dies that correspond to the plurality of channels in at least a portion or the entire portion of the plurality of ways.

14. The method of claim 13, wherein the storing the second data comprises:

storing the second data in the second number of memory dies among memory dies corresponding to the first way and in which the first data is not stored; and storing the second data in at least a portion of memory dies, corresponding to the second way and corresponding to a channel in which the second data is not stored in the first way, among memory dies in which the first data is not stored in the second way.

15. The method of claim 14, wherein the first data and the second data are stored in memory dies corresponding to the first way based on the value of the first number, the value of the second number, and a predetermined order of storing the first data and the second data.

16. The method of claim 12, further comprising:

storing the first data in the first number of memory dies, among memory dies corresponding to the first way, using at least a portion of a plurality of first wordlines corresponding to each other in each of the plurality of memory dies; and storing the first data in the first number of memory dies, in which the first data is not stored in memory cells connected to a first wordline, among memory dies corresponding to the first way, using at least a portion of a plurality of second wordlines corresponding to each other in each of the plurality of memory dies, wherein the first data is stored to correspond to each of the plurality of memory dies.

17. The method of claim 13, wherein the value of the first number is smaller than the value of the second number, and the storing the second data comprises, after the first data are stored in the first number of memory dies in the second way, storing the second data in the second number of memory dies in the second way.

18. The method of claim 11, further comprising:

outputting the first data using the plurality of channels in response to receiving a read request for the first data.

19. A storage device comprising:

a nonvolatile memory device comprising a plurality of channels, each channel of the plurality of channels comprising a plurality of memory dies corresponding to a plurality of ways; and a storage controller, wherein the storage controller comprises:

a command queue configured to store commands transmitted from a plurality of tenants, an input command handler configured to fetch the commands from the command queue;

a channel allocator configured to determine a first number of channels required to store first data of a first tenant based on at least one of (i) information included in a command received from the first tenant or (ii) information included in the commands transmitted from the plurality of tenants; and a placement unit configured to store the first data in a first number of memory dies in each way of the plurality of ways, a value of the first number of the first number of channels being equal to a value of the first number of the first number of memory dies, and wherein the first data is stored in memory dies that evenly correspond to the plurality of channels in at least a portion or an entire portion of the plurality of ways.

20. The storage device of claim 19, wherein the placement unit is further configured to:

store the first data in the first number of memory dies, among memory dies corresponding to a first way; and store the first data in the first number of memory dies corresponding to channels, in which the first data is not stored in the first way, among memory dies corresponding to a second way.

* * * * *